United States Patent [19]
Derksen

[11] Patent Number: 6,164,553
[45] Date of Patent: Dec. 26, 2000

[54] HEAT RECOVERY SYSTEM AND HEAT EXCHANGER THEREFOR

[76] Inventor: William Edmond Derksen, 2615 Spruce Needle Drive, Toronto, Ontario, Canada, L5L 1M8

[21] Appl. No.: 09/236,549

[22] Filed: Jan. 26, 1999

Related U.S. Application Data

[63] Continuation-in-part of application No. 08/888,943, Jul. 7, 1997, abandoned.

[51] Int. Cl.$^7$ ...................................................... B60H 1/02
[52] U.S. Cl. .................................. 237/12.3 C; 237/12.36
[58] Field of Search ............................... 237/12.3 R, 8 R, 237/12.3 B; 126/350 A; 165/154, 156

[56] References Cited

U.S. PATENT DOCUMENTS

| | | | |
|---|---|---|---|
| 3,339,260 | 9/1967 | Burne et al. | 165/154 |
| 4,095,575 | 6/1978 | Wulf | 123/142.5 R |
| 4,391,235 | 7/1983 | Majkrzak | 123/142.5 R |

*Primary Examiner*—Harold Joyce
*Assistant Examiner*—Derek S. Boles

*Attorney, Agent, or Firm*—Dowell & Dowell, P.C.

[57] ABSTRACT

This invention relates to a heat exchanger for a vehicle with an internal combustion engine and an exhaust pipe extending from the internal combustion engine having a main member with a first end and a second end. The main member has an exhaust passageway extending therethrough from said first end to said second end and, as well, a heat recovery chamber with an inlet opening for the introduction of heat recovery fluid into the heat recovery chamber and an outlet opening for the exiting of heat recovery fluid from the heat recovery chamber. The heat recovery chamber is of a proximity to the exhaust passageway to permit the withdrawing of heat from exhaust fluid passing through the exhaust passageway by liquid coolant entering through the inlet opening, flowing through the heat recovery chamber and out of the outlet opening during the operation of the vehicle. There are also provided mounting means for mounting the main member in-line on an exhaust pipe of a vehicle permitting closed fluid communication of exhaust fluid from the exhaust pipe of the vehicle through the exhaust passageway of the main member into the further exhaust pipe of the vehicle, during use.

2 Claims, 4 Drawing Sheets

HEAT RECOVERY SYSTEM AND HEAT EXCHANGER THEREFOR

FIELD OF INVENTION

The present invention relates to a heat exchanger and a heat exchanging system for vehicles having internal combustion engines. This application is a continuation-in-part application of U.S. patent application, Ser. No. 08/888,943 filed on Jul. 7, 1997 now abandoned.

BACKGROUND OF THE INVENTION

The usual manner of heating the interior of a vehicle during cold weather is by extracting heat from the vehicle's engine. However, in the case of certain vehicles, particularly large vehicles such as school buses running on diesel fuel, this can be unsatisfactory be cause the engine takes time to warm up and, even after the engine has warmed up, insufficient heat is produced by the engine.

This problem of insufficient heat in the interior of these vehicles has continued to plague the vehicle art despite numerous proposals to solve it.

Proposals to solve the problem have included providing separate heat-exchange systems with added pipe configurations to supplement the already-existing engine-coolant heat exchanger. These proposals have not been readily adopted by the art because they require too much modification to the vehicle for implementation, are too complicated to be easily made, are not sufficiently effective or are too expensive in relation to the result achieved.

Consequently, in practical terms, the problem of insufficient heating in vehicles that can cannot be adequately heated by the engine alone has remained until the invention of the present invention.

It is an object of the present invention to provide a heat exchanger and a heat exchange system which is simple to install on a conventional vehicle for the purposes of supplementing the heating of the vehicle by the engine.

It is a further object of the present invention to provide a heat exchanger which effectively and inexpensively supplements the heating of the vehicle by the engine.

It is a further object of the present invention to provide a heat exchanger which can effectively work off of the same coolant heat-exchange system as does the engine.

Other objects and achievements of the invention will be apparent and be readily appreciated upon reading the rest of the specification.

SUMMARY OF THE INVENTION

According to one aspect of the present invention, there is provided a heat exchanger for a vehicle with an internal combustion engine and an exhaust pipe extending from the internal combustion engine, comprising: a main member with a first end and a second end; said main member having an exhaust passageway extending therethrough from said first end to said second end and said main member having a heat recovery chamber with an inlet opening for the introduction of liquid coolant into the heat recovery chamber and an outlet opening for the exiting of liquid coolant from the heat recovery chamber, said heat recovery chamber being of a proximity to the exhaust passageway to permit the withdrawing of heat from exhaust fluid passing through the exhaust passageway by liquid coolant entering through the inlet opening, flowing through the heat recovery chamber and out of the outlet opening during the operation of the vehicle; mounting means for mounting the main member in-line on an exhaust pipe of a vehicle permitting closed fluid communication of exhaust fluid from the exhaust pipe of the vehicle through the exhaust passageway of the main member into the further exhaust pipe of the vehicle.

According to another aspect of the present invention, there is provided, in a heat recovery system for a vehicle with an internal combustion engine and an exhaust pipe extending from the internal combustion engine: a heat exchanger having a main member with a first end and a second end; said main member having an exhaust passageway extending therethrough from said first end to said second end and said main member having a heat recovery chamber with an inlet opening for the introduction of liquid coolant into the heat recovery chamber and an outlet opening for the exiting of liquid coolant from the heat recovery chamber, said heat recovery chamber being of a proximity to the exhaust passageway to permit the withdrawing of heat from exhaust fluid passing through the exhaust passageway by heat recovery fluid entering through the inlet opening, flowing through the heat recovery chamber and out of the outlet opening during the operation of the vehicle; mounting means mounting the main member in-line to the exhaust pipe of the vehicle permitting closed fluid communication of exhaust fluid from the exhaust pipe of the vehicle through the exhaust passageway of the main member into the further exhaust pipe of the vehicle.

DESCRIPTION OF THE DRAWINGS

The invention will be more readily understood after reading the following description of the preferred embodiments of the present invention given in conjunction with the drawings in which.

DETAILED DESCRIPTION OF THE PREFERRED EMBODIMENTS

Figure 1:
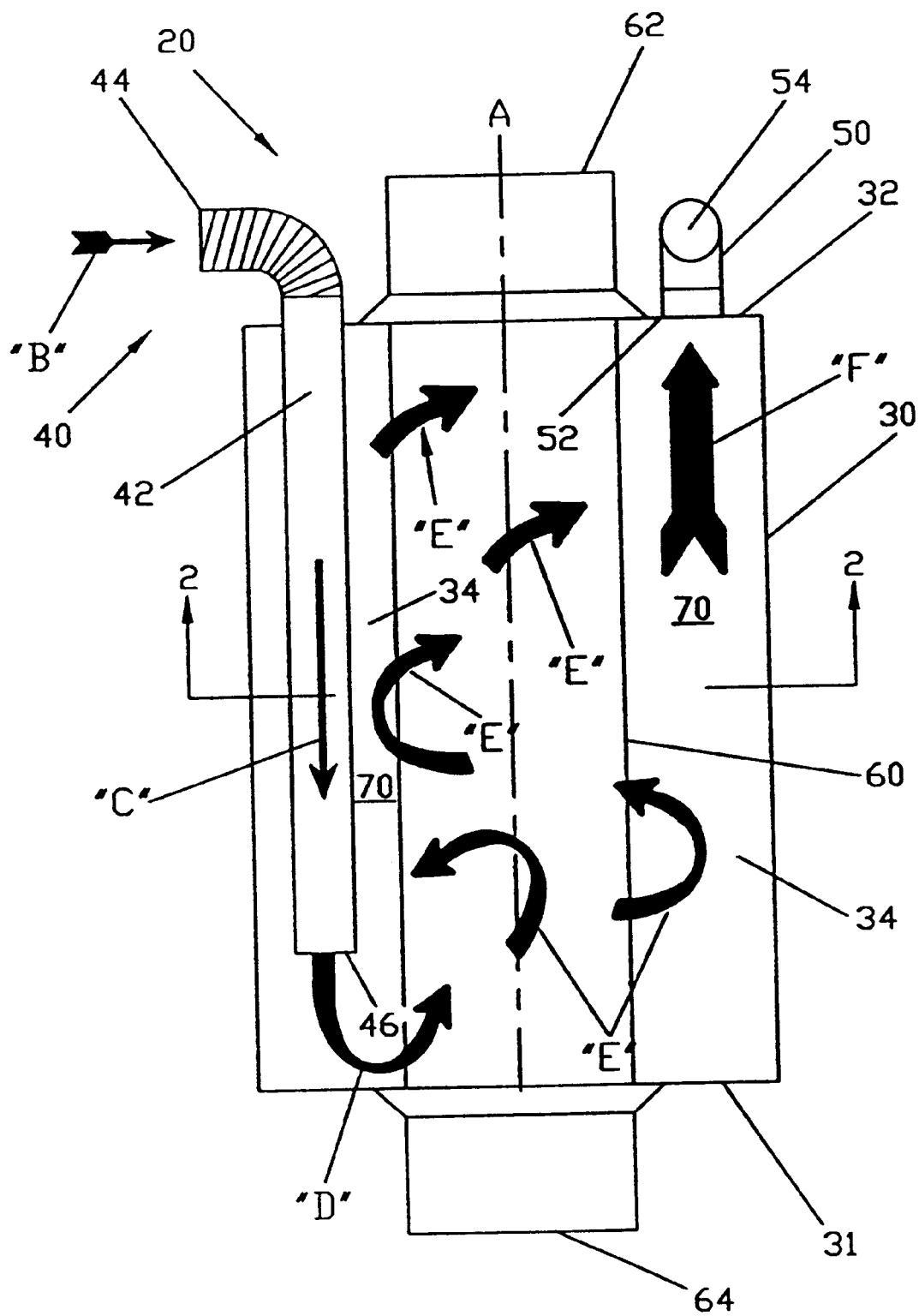
FIG. 1 is a cut-away top plan view of the heat exchanger.
Figure 2:
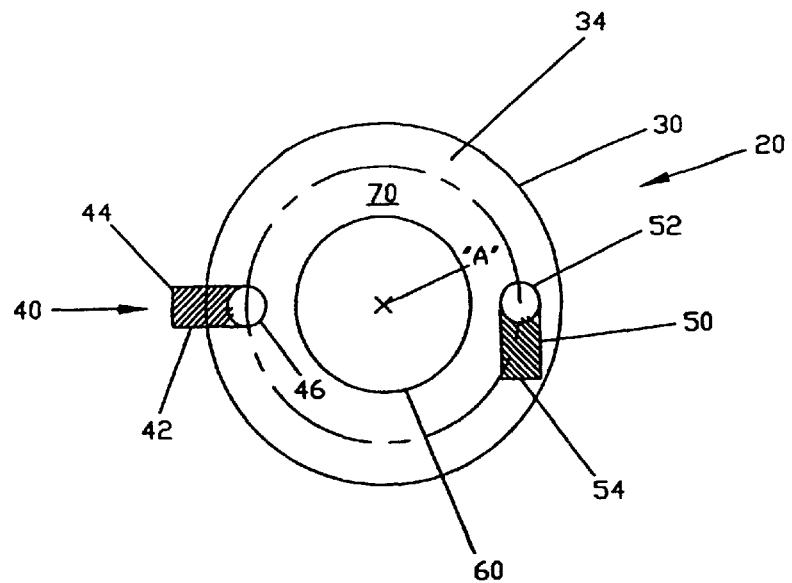
FIG. 2 is a cross-sectional view taken along section line 2—2 of FIG. 1.

Referring to the drawings, the heat exchanger comprises a main member, generally referred to by the numeral 8 mounted in-line to the exhaust pipe 10 of a vehicle. The main member 8 has an outer casing wall 11 and an exhaust pipe 12. The exhaust pipe 12 provides an exhaust passageway 14. The pipe 12 is surrounded by a heat recovery chamber 16 formed within the casing wall 11 of the main unit 8. In respect of the heat recovery chamber 16, there is provided an inlet opening at 18 and an outlet opening at 20. Extending through the inlet opening at 20 and into the heat recovery chamber 16 is a delivery tube 22. Extending from the outlet opening for delivery of liquid coolant out of the heat recovery chamber 16 is outlet tube 21.

Mounting means in the form of muffler clamps are used to secure the main member 8 at 24 in-line to the exhaust pipe 10 of the vehicle. The main member 8 is also secured to the underbody of the car using conventional bracket members (not shown).

The main member 8 is mounted to the exhaust pipe 10 of the vehicle so that the exhaust pipe 12 provides a through passageway through the main member 8 for exhaust being emitted through the exhaust pipe 10.

The exhaust pipe 10 of the vehicle, as is conventional, receives exhaust from its engine, generally referred to in the drawings by the numeral 26.

The heat recovery chamber 16 surrounds the exhaust pipe 12 for the purposes of extracting heat from hot exhaust fluid emitted from the engine into the exhaust pipe 10. In this regard, liquid coolant is introduced into the heat recovery chamber 16 from the engine 26 through conduits 28 flowing in the direction of the arrows numbered 30.

In use, the liquid coolant flows from the engine 26 as aforesaid into the main body member 8, via conduits 28, through the inlet opening at 18 via delivery tube 22 as indicated by arrows 29 and 31. The delivery tube 22 causes the inflowing liquid coolant to flow against the against the wall of the far end (relative to the inlet opening 18 and hereafter referred to as the second end 34 of the main member 8) of the heat recovery chamber 16 as indicated by arrow 33. After being introduced into the heat recovery chamber from the delivery tube 22, the liquid coolant flows from the second end, around the exhaust pipe 12 in the direction of arrows 37, whereat heat is absorbed from exhaust fluid flowing through the exhaust pipe 12, and exits through outlet opening at 20 at the first end 35 of the main member 8 via outlet tube 21 in the direction of arrow 39. Connected to outlet tube 21 are conduits 38 for returning heated liquid coolant back to the engine, or the core heater as the case may be, in the direction of arrows 40.

The conduits 28, 38 are standard liquid coolant conduits made from a suitable material such as copper, aluminum or stainless steel.

By placing both the inlet opening 18 and the outlet opening 20 at the first end 33 of the main member 8, the main member 8 can thereby be mounted in-line to an exhaust pipe 10 regardless of whether the exhaust pipe 10 extends along a vertical axis (as is the case with many diesel vehicles) or along a horizontal axis. This is a significant advance in the art because it allows the operator use of this invention regardless of the orientation of the exhaust pipe 10 of the vehicle.

Looking at a heat recovery system as a whole, the particular embodiments of the different heating systems will now be described. Throughout, like numerals will be used to indicate like parts.

Figure 3:
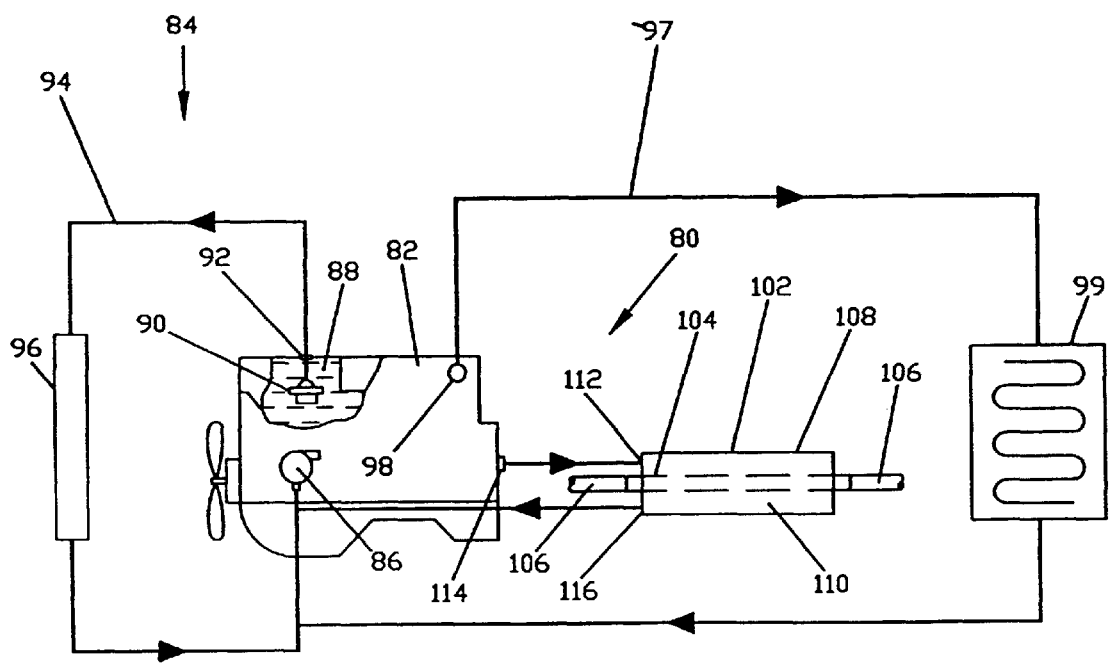
FIG. 3 is a simplified pictorial view of a first preferred embodiment of the heat recovery system of the present invention.

Referring to the embodiment shown FIG. 3, there is shown an internal combustion engine 26 with a conventional engine cooling system, as indicated by the general reference numeral 37. The engine cooling system 42 includes a liquid coolant pump 44 to circulate the liquid coolant 45 within the engine 26. Above a predetermined temperature, a thermostat 46 opens and permits the liquid coolant to flow past the thermostat 46, exit the engine 26 through a liquid coolant outlet 48 and pass through a circuit 50 to the radiator 52. The liquid coolant pump 44 draws the liquid coolant 45 back from the radiator 52. An essentially separate circuit 54 allows for the flow of the liquid coolant 45 from another liquid coolant outlet 56 and through a heater core 41 in the vehicle, whereat the liquid coolant 45 provides heat to the interior of the vehicle. The liquid coolant pump 44 draws the liquid coolant 45 back from the heater core 41 via circuit 58. The arrangement as described only in this paragraph is standard to most vehicles having internal combustion engines.

What is not standard is the mounting of the main member 8 in-line on the pre-existing exhaust pipe 10 with the exhaust pipe 12 of the main member providing for the passageway of exhaust fluid through the main member 8. Conduits 28 provide for the flow of liquid coolant 45 from the engine 26 into the heat recovery chamber 16. During use, as hot exhaust gases emitted from the engine 26 pass through the exhaust pipes 10 and the exhaust pipe 8, the liquid coolant passing through the heat recovery chamber 16 draws heat from the hot exhaust gases. The liquid coolant 45 then exits the heat recovery chamber 16 through conduit 38 at a higher temperature than the temperature at which it was introduced into the heat recovery chamber 16. The conduit 38 is connected to liquid coolant pump 44 so that the heated liquid coolant 45 is supplied to the engine 26.

Figure 4:
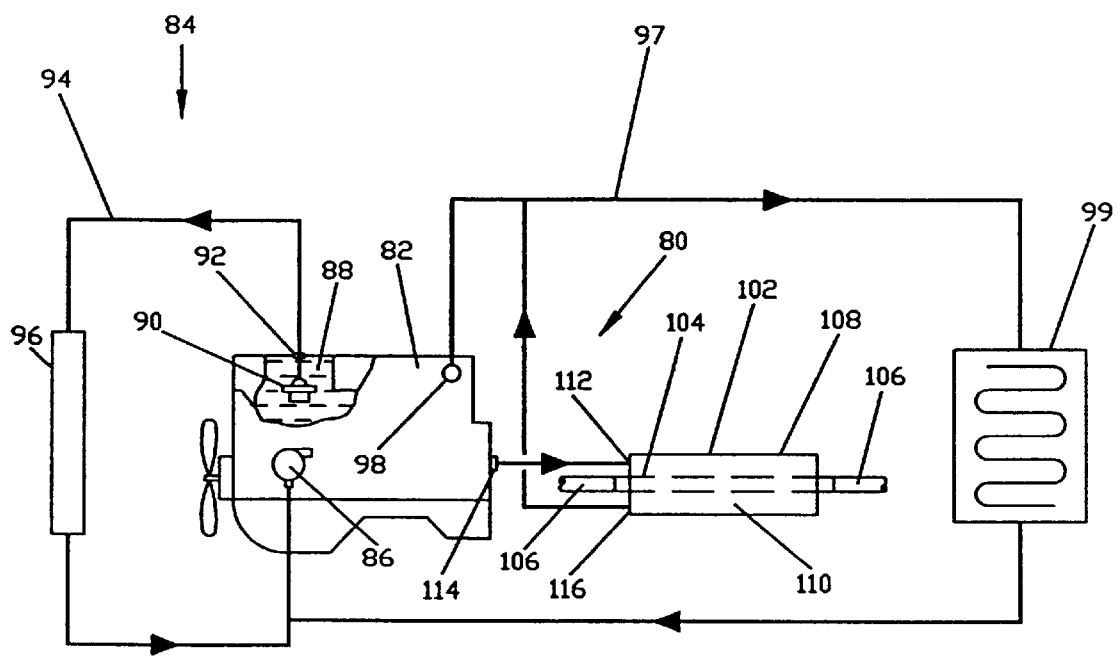
FIG. 4 is a simplified pictorial view of a second preferred embodiment of the heat recovery system of the present invention.

In the embodiment shown in FIG. 4, the heating system works in a similar manner as the embodiment shown in FIG. 3 except that the main member 8 is connected in parallel with the heater core 58 with the heated liquid coolant being supplied to the heater core 41 as opposed to the internal combustion engine 26.

Figure 5:
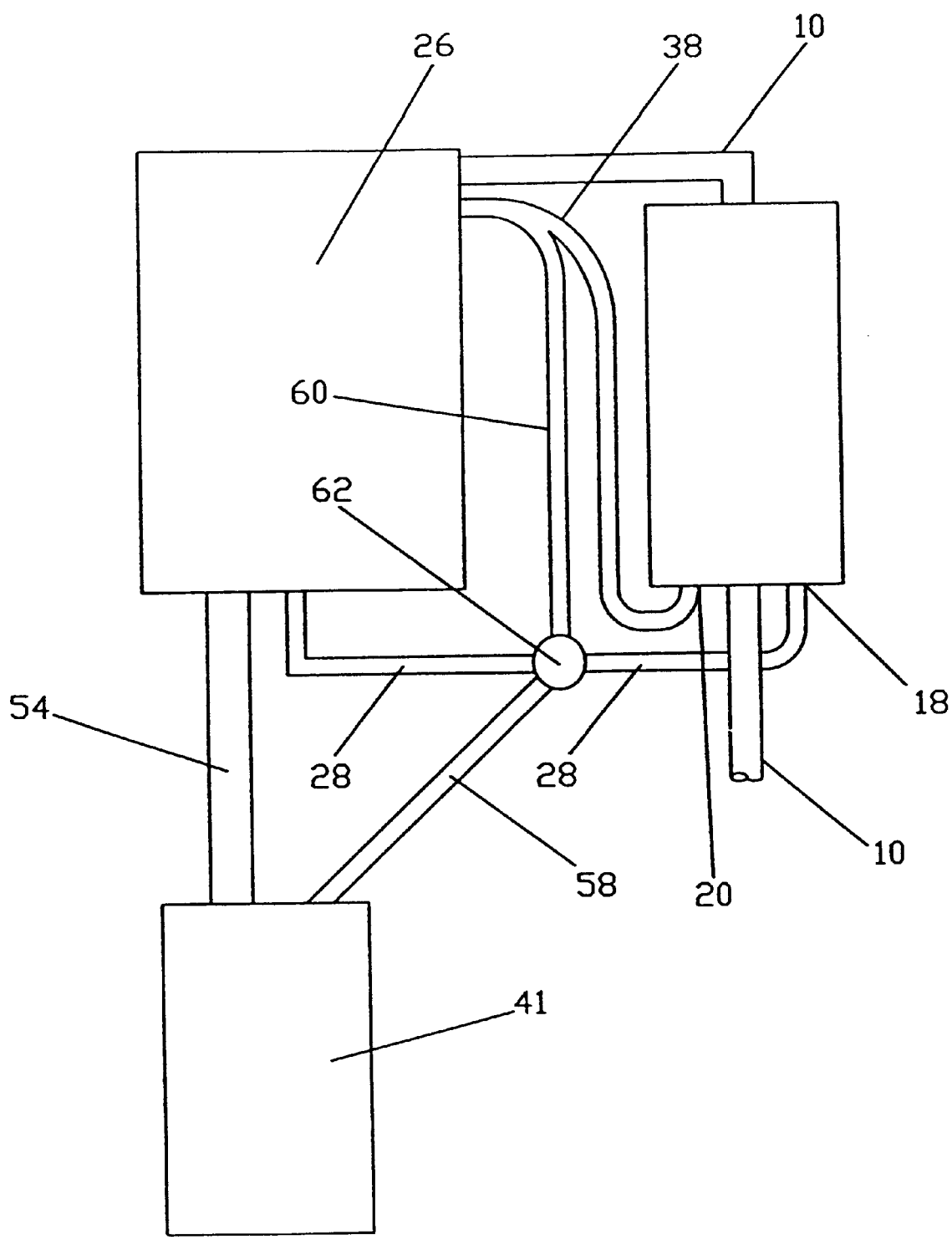
FIG. 5 is a block illustration showing the main components of a third preferred embodiment of the heat recovery system of the present invention with a temperature-controlled valve means for the prevention of over-heating.

In the embodiment shown in FIG. 5, the embodiment is similar to that shown in FIG. 3 except that there is provided a further conduit 60 interconnecting conduits 28, 38 which permits the bypassing of the main member 8 when the temperature of the liquid coolant is above a pre-determined temperature as determined by a three-way thermostat valve connector 62. If the liquid coolant is above the pre-determined temperature, the three-way thermostat valve connector 62 will re-direct the flowing of liquid coolant 45 from the engine 26 into conduit 60, shutting off flow of the liquid coolant to the main member 8. Conduit 60 directs the flow of liquid coolant back to the engine 26 via conduit 38. During the bypass, normal operating pressures prevents backflow into main member 8. However, if the temperature of the liquid coolant is below the pre-determined temperature, three-way thermostat valve connector 62 shuts off flow of the liquid coolant from conduit 28 into conduit 60 and permits the continuous flow of the liquid coolant 45 into the heat recovery chamber 16 in a manner similar to that described with respect to the embodiment in FIG. 3, i.e. through conduit 28. After the heated liquid coolant exits the main member 8, the liquid coolant is drawn back to the engine 26 by a pump valve in the engine 26. In situations of changing seasons, certain vehicles will tend to underheat in colder weather but overheat in warmer weather. In situations of the colder weather, such a temperature sensitive valve system will permit the heat exchanger mounted in-line to the exhaust pipe 10 to add heat to the system. In situations of the warmer weather, the thermostat means will prevent overheating when the temperature of the liquid coolant is already sufficiently hot from the engine.

Alternatively to using three-way thermostat valve connector 62, a manual valve can be used in lieu of the three-way thermostat valve connector 62. The manual valve is mounted at the same position as is shown for the three-way thermostat valve connector 62. During winter, when heating of the vehicle is difficult, the valve is opened to permit liquid coolant to flow through conduits 28, through the heat exchange chamber of the main member 8 and back to the engine 26 via conduit 38. However, if overheating is a problem because of warm temperatures, the manual valve is manually shut off for the season to redirect the flow of heat coolant through conduit 60, bypassing main member 8 and back to the engine 26 via conduit 38.

Those skilled in the art will be aware of suitable three-way thermostat valve connectors or manually set valves which can be incorporated into the present invention. They are readily available commercially and the specification required is dependent upon the circumstances of use.

Throughout, by mounting the main member in-line, space is saved over the embodiments of the prior art because no added area is required for the exhaust passageway. Also, by mounting the main member 8 in-line, the main member 8 can be placed close to the engine, thereby being positioned to receive exhaust gas from the engine at higher temperatures than would be possible if the main member 8 had been placed farther away from the engine, as is the case with much of the prior art. Also, the in-line installation on the pre-existing exhaust pipe 10 permits in-field installation on practically any pre-existing, vehicle.

It will be understood that the embodiments illustrated are preferred embodiments and that the specification is not to be read in a limited sense. Alternatives are possible without deviating from the invention, the scope of which is as defined and set out in the appended claims.

I claim:

1. A heat exchanger for a vehicle with an internal combustion engine and an exhaust pipe extending from the internal combustion engine, comprising:

a main member with a first end and a second end;

said main member having an exhaust passageway extending therethrough from said first end to said second end, said main member defining therein a heat recovery chamber, an inlet in said first end of said main member for the introduction of a heat recovery fluid into the heat recovery chamber and an outlet opening in said first end of said main member for the exiting of heat recovery fluid from the heat recovery chamber, said inlet for the introduction of heat recovery fluid including a delivery tube mounted within said exhaust chamber extending from said first end of said main body to adjacent said second end thereof to deliver heat recovery fluid into the heat recovery chamber to increase heat exchange during use, said heat recovery chamber being of a proximity to the exhaust passageway to permit the withdrawing of heat from exhaust fluid passing through the exhaust passageway by heat the heat recovery fluid flowing through the heat recovery chamber and out of the outlet opening during the operation of the vehicle, and mounting means adapted for mounting the main member in-line on an exhaust pipe of a vehicle thereby permitting fluid communication of exhaust fluid from the exhaust pipe of the vehicle through the exhaust passageway of the main member whereby said main body is adapted to be mounted in-line to an exhaust pipe which extends either vertically or horizontally from an engine.

2. A heat exchanger as claimed in claim 1 wherein:

a first conduit means mountable between the liquid coolant supply of the engine and the main member for delivering heat recovery fluid in the form of liquid coolant from the engine to the delivery tube extending through the main member during operation of the vehicle;

a second conduit means mountable between the main member and the engine for delivering liquid coolant from the heat recovery chamber of the main member exiting the outlet opening to the engine during operation of the vehicle, and a temperature controlled valve means mountable between said first and second conduit means and being connected to engine temperature sensing means to thereby shut off flow of liquid coolant into the heat recovery chamber of the main member when the temperature of the engine reaches a pre-determined temperature and to re-permit flow of liquid coolant into the heat recovery chamber of the main member when the temperature of the engine falls below the pre-determined temperature.

\* \* \* \* \*